(12) United States Patent
Osborne

(10) Patent No.: US 8,208,049 B1
(45) Date of Patent: Jun. 26, 2012

(54) DIGITAL IMAGING DEVICE HAVING A MULTICOLOR PIXEL ARRAY SENSOR AND METHOD

(76) Inventor: Thomas W. Osborne, San Jose, CA (US)

( * ) Notice: Subject to any disclaimer, the term of this patent is extended or adjusted under 35 U.S.C. 154(b) by 2714 days.

(21) Appl. No.: 10/793,428

(22) Filed: Mar. 4, 2004
(Under 37 CFR 1.47)

(51) Int. Cl.
*H04N 3/14* (2006.01)
*H04N 5/335* (2011.01)
*H04N 9/04* (2006.01)
*H04N 9/083* (2006.01)

(52) U.S. Cl. ...................................................... 348/272
(58) Field of Classification Search .................. 348/246, 348/247, 241, 449, 266, 272, 273
See application file for complete search history.

(56) References Cited

U.S. PATENT DOCUMENTS

| 5,965,875 | A | 10/1999 | Merrill | |
|---|---|---|---|---|
| 6,731,397 | B1 * | 5/2004 | Merrill et al. | 358/1.16 |
| 6,747,805 | B2 * | 6/2004 | Sayag | 359/664 |
| 2004/0051798 | A1 * | 3/2004 | Kakarala et al. | 348/246 |

* cited by examiner

*Primary Examiner* — Nicholas Giles
(74) *Attorney, Agent, or Firm* — Wade J. Brady, III; Frederick J. Telecky, Jr.

(57) ABSTRACT

A digital imaging device is provided that includes a high modulation transfer function lens and a multicolor pixel array sensor. The lens is operable to receive an incoming signal and to provide a focused signal based on the incoming signal. The multicolor pixel array sensor, which is adjacent to the lens, is operable to receive the focused signal from the lens and to generate a sensor signal based on the focused signal. The device may also include an interpolator coupled to the multicolor pixel array sensor. The interpolator is operable to receive the sensor signal from the multicolor pixel array sensor and to interpolate the sensor signal to generate an interpolated signal.

20 Claims, 2 Drawing Sheets

DIGITAL IMAGING DEVICE HAVING A MULTICOLOR PIXEL ARRAY SENSOR AND METHOD

TECHNICAL FIELD OF THE INVENTION

The present invention is directed in general to imaging systems and, more specifically, to an improved digital imaging device having a multicolor pixel array sensor and method.

BACKGROUND OF THE INVENTION

Image sensor arrays are used in many imaging applications, such as digital cameras, scanners, video camcorders and the like. A common sensor array used in conventional imaging applications is a Bayer pattern image sensor array, in which twice as many green pixels as red and blue pixels are used to detect an image. For images that have red frequency content greater than the Nyquist frequency, an alias artifact commonly known as false colors will occur with a Bayer sensor. This artifact typically occurs where there are sharp contrast images, such as shadows that have discoloration along the edges of the high contrast image or where there are large areas of high frequency content, such as cyclone fences and shingled rooftops, resulting in a large area of discoloration.

In order to eliminate or minimize the effects of aliasing, conventional imaging applications filter out the higher frequencies in an image or minimize those frequencies using a lens before the image is projected onto the sensor. For filtering out the higher frequencies, an optical low pass filter (OLPF) is typically used. The OLPF assures that light rays from any spot on an object will be projected onto four adjacent pixels. However, disadvantages associated with the use of OLPFs include their expense and the amount of space they require between the lens and the sensor. The expense and space requirements prohibit the use of OLPFs in low cost cameras and in low profile cameras. Thus, as the size of camera modules decreases by using fewer pixels, the feasibility of using OLPFs in these cameras is virtually eliminated.

An alternative to the use of OLPFs is the use of a lens designed to act as a filter by reducing the level of the higher frequency content in an image. However, if frequencies above the Nyquist frequency for a particular lens are not sufficiently filtered out, false colors and moiré patterns will occur. If they are filtered to an acceptable level, false colors may still appear with an attenuated intensity that is considered acceptable. One problem with this alternative, however, is that the lens must be designed to be less sharp than would otherwise be desired in order to filter out the higher frequencies, resulting in a loss of resolution.

As an alternative to Bayer pattern image sensor arrays, multicolor pixel sensor arrays have been developed recently. A pixel is one element of space that provides one piece of information about an object in space. Thus, a multicolor pixel sensor array has been described as "seeing" the same number of pixels in space as a Bayer pattern image sensor array. However, as described above, typical imaging applications that use Bayer pattern image sensor arrays, or other single color pixel sensor arrays, blur the light coming from an element of an object onto four pixels of the sensor array. Because of this, these imaging applications are only able to "see" a picture element that is four times the size of a picture element that could be "seen" if a perfect lens focused on one single pixel of the sensor array.

An OLPF is generally used to assure that the light from a picture element will be cast on all four colors. For example, for a Bayer pattern image sensor array, the light from a picture element is cast on Green on the Red Channel, Green on the Blue channel, the Red channel, and the Blue channel, which make up Gr, Gb, R and B. As an alternative to an OLPF, a lens may be used to blur the light from a picture element on all four colors (Gr, R, Gb and B). Thus, a single color pixel sensor array is unable to "see" a picture element for each color sensor.

For a Bayer pattern image sensor array, false colors will occur if an OLPF is not used or the light coming from an object is not blurred over four colors, i.e., Gr, R, Gb and B. The colors of cyan and yellow will occur along the edges of images or areas of high frequency. It has been found that false colors are very objectionable to the end user. For this reason, an OLPF or the practice of blurring the image is used.

However, this is not the case with moiré patterns. Moire patterns are the result of aliasing, which will occur when the sampling frequency of the array is exceeded. In order to prevent moiré patterns, the special frequencies reaching the array at the Nyquist frequency must be reduced. It has been observed that the end user is less sensitive to some low level of moiré patterns. Oftentimes, end users using low cost cameras will not object, but end users using higher cost cameras will not want to see moiré patterns. This means a camera manufacturer can balance the use of a sharper lens against what they think is an acceptable level of moiré patterns. Thus, while false colors are a dead stop and must be greatly minimized or eliminated, end users are more tolerant of moiré patterns.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
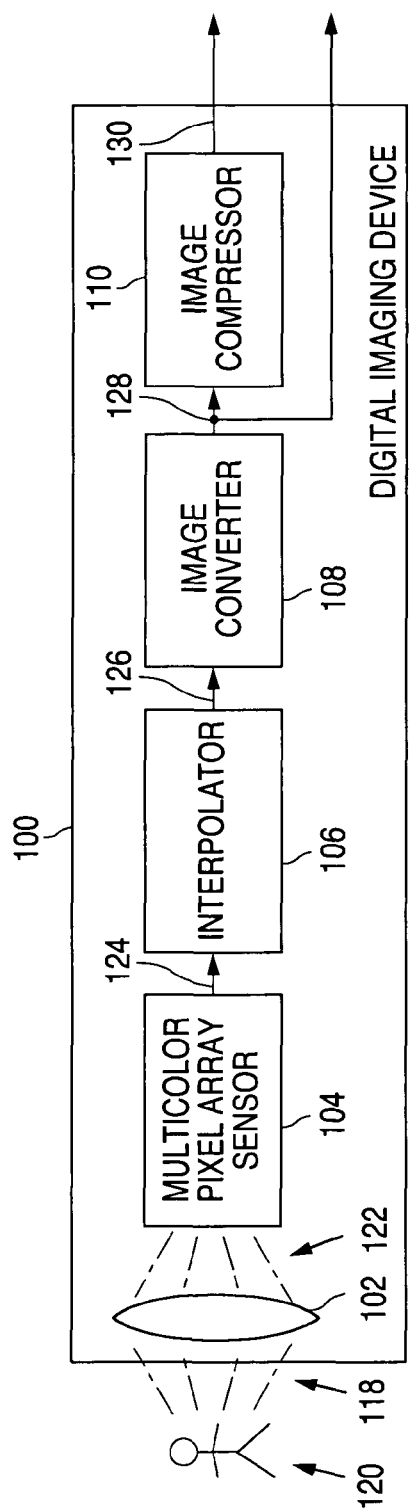
FIG. 1 is a block diagram illustrating a digital imaging device in accordance with one embodiment of the present invention.
Figure 3:
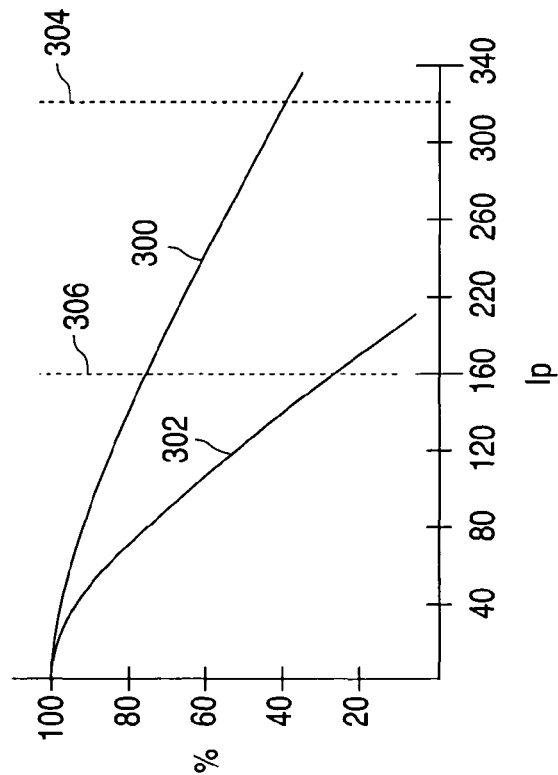
FIG. 3 is a graph illustrating a modulation transfer function curve for the lens of the digital imaging device of FIG. 1 in accordance with one embodiment of the present invention.
Figure 2:
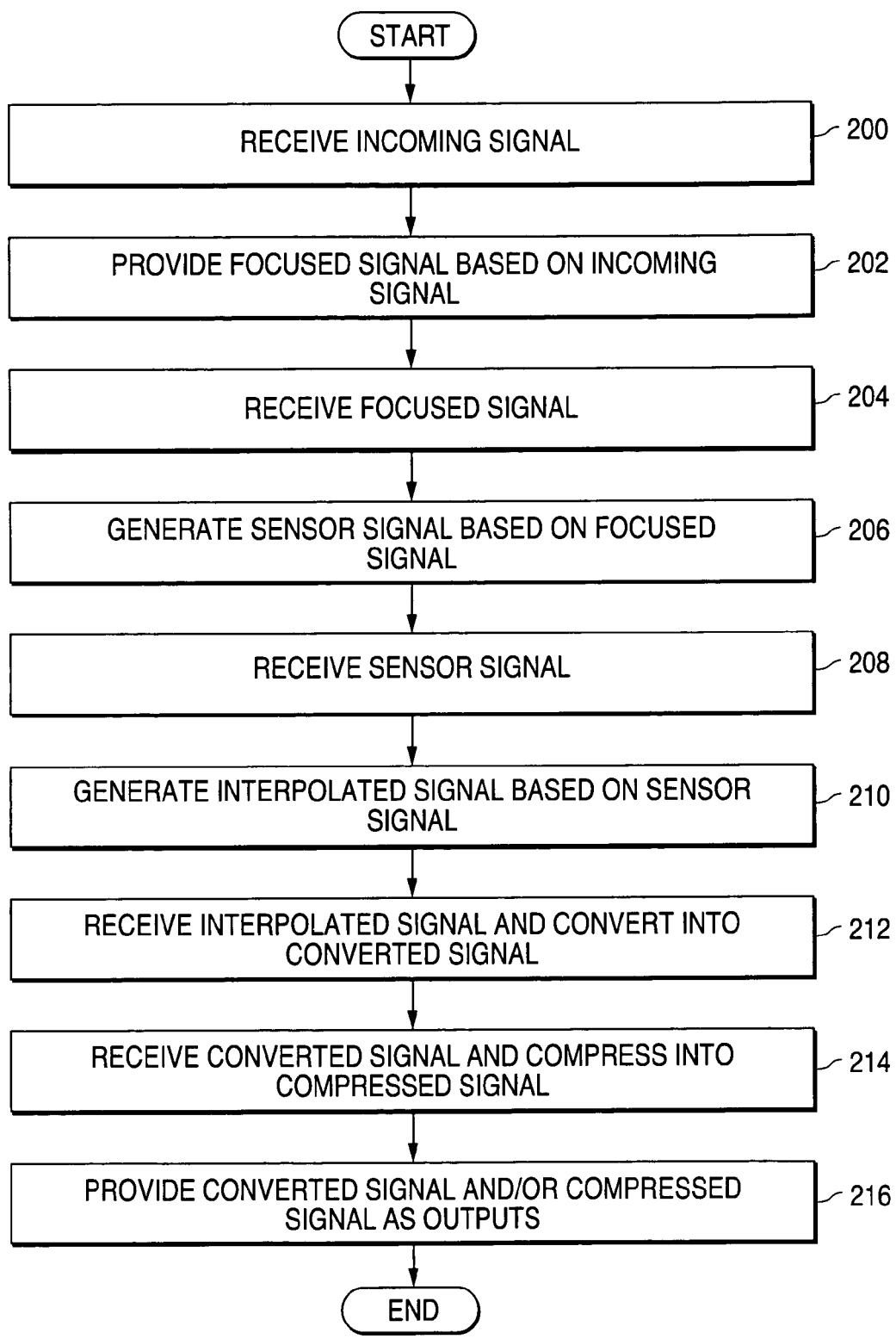
FIG. 2 is a flow diagram illustrating a method for detecting an image using the digital imaging device of FIG. 1 in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital imaging device.

FIG. 1 is a block diagram illustrating a digital imaging device 100 in accordance with one embodiment of the present invention. The digital imaging device 100 may comprise a digital camera, a mobile telephone with imaging capabilities, or any other suitable device operable to capture digital images.

The digital imaging device 100 comprises a lens 102 and a multicolor pixel array sensor 104. The digital imaging device 100 may also comprise an interpolator 106, an image converter 108 and/or an image compressor 110, in addition to any other suitable components in accordance with the particular embodiment of the digital imaging device 100.

The lens 102 comprises a high modulation transfer function (MTF) lens. As described in more detail below, in connection with FIG. 3, a high MTF lens comprises a lens that is relatively sharp, while a low MTF lens comprises a lens that is less sharp and has a low MTF for frequencies above a corresponding Nyquist frequency. The lens 102 is operable to receive an incoming signal 118 corresponding to light reflecting off an image 120 to be detected and to focus the incoming signal 118 onto the multicolor pixel array sensor 104 to generate a focused signal 122.

The multicolor pixel array sensor 104 comprises a digital image array in which at least two samples are taken for each pixel for a particular image 120. For example, the multicolor pixel array sensor 104 may comprise a FOVEON X3 image sensor, which samples three colors per pixel. The multicolor pixel array sensor 104 may also comprise any suitable VGA three-color pixel array sensor. However, it will be understood that the multicolor pixel array sensor 104 may comprise any suitable sensor in which more than one color is sampled for each pixel. The lens 102 and the multicolor pixel array sensor 104 are located adjacent to each other. As used herein, "adjacent" means that no components are located between the lens 102 and the multicolor pixel array sensor 104.

The multicolor pixel array sensor 104 is operable to receive the focused signal 122 from the lens 102 and to generate a sensor signal 124 based on the focused signal 122. As used herein, "focused signal" means a signal that has been focused by the lens 102 but that is not filtered by any separate filtering device.

According to one embodiment, the multicolor pixel array sensor 104 is operable to generate the sensor signal 124 by generating red, green and blue data for each pixel in the multicolor pixel array sensor 104. However, it will be understood that the sensor signal 124 may be otherwise generated without departing from the scope of the present invention.

The interpolator 106 is operable to interpolate the data in the sensor signal 124 received from the multicolor pixel array sensor 104 such that the amount of data output by the interpolator 106 matches the amount of data expected by other components of the digital imaging device 100, such as the image converter 108 or other suitable component. In doing this, the interpolator 106 is operable to generate an interpolated signal 126 based on the sensor signal 124. Although the interpolator 106 is shown as a separate component in FIG. 1, it will be understood that the functionality of the interpolator 106 may be implemented in the multicolor pixel array sensor 104, the image converter 108, or any other suitable component of the digital imaging device 100 without departing from the scope of the present invention.

For one embodiment, the interpolator 106 is operable to generate the interpolated signal 126 by estimating a pixel that is approximately in the center of four other pixels. In this way, the interpolator 106 may generate an additional pixel for each pixel in the multicolor pixel array sensor 104, thereby effectively doubling the number of pixels available for use in the digital imaging device 100. The interpolator 106 may also be operable to generate the interpolated signal 126 by estimating data for one estimated pixel between each pair of pixels in the multicolor pixel array sensor 104 and by estimating data for one estimated pixel on a diagonal between pixels in the multicolor pixel array sensor 104.

Thus, for example, for the embodiment in which the multicolor pixel array sensor 104 comprises a VGA three-color pixel array sensor, the interpolator 106 may generate an interpolated signal 126 equivalent to that of a 1280×960 Bayer pattern image sensor array that uses one color detector per pixel. In this embodiment, the resulting image embodied in the interpolated signal 126 is equivalent to an image generated by a Bayer pattern image sensor array with four times as many pixel detectors as the multicolor pixel array sensor 104.

The image converter 108 is operable to convert the interpolated signal 126 received from the interpolator 106 into any suitable format for use in the digital imaging device 100 or for output to another suitable device as a converted signal 128. According to one embodiment, the image converter 108 comprises an RGB-to-YCrCb 4:2:2 converter. However, it will be understood that the image converter 108 may comprise any other suitable type of converter.

The image compressor 110 is operable to compress the converted signal 128 received from the image converter 108 into any suitable compressed format for use in the digital imaging device 100 or for output to another suitable device as a compressed signal 130. According to one embodiment, the image compressor 110 comprises a JPEG compressor that is operable to generate a JPEG output for the compressed signal 130. However, it will be understood that the image compressor 110 may comprise any other suitable type of compressor.

FIG. 2 is a flow diagram illustrating a method for detecting an image 120 in accordance with one embodiment of the present invention. The method begins at step 200 where an incoming signal 118 reflected off an image 120 to be detected is received at the lens 102. At step 202, the lens 102 focuses the incoming signal 118 to provide a focused signal 122. At step 204, the multicolor pixel array sensor 104 receives the focused signal 122 from the lens 102. At step 206, the multicolor pixel array sensor 104 generates a sensor signal 124 based on the focused signal 122 by sampling at least two colors for each pixel in the multicolor pixel array sensor 104.

At step 208, the interpolator 106 receives the sensor signal 124 from the multicolor pixel array sensor 104. At step 210, the interpolator 106 generates an interpolated signal 126 based on the sensor signal 124. The interpolated signal 126 comprises data corresponding to an increased number of pixels as compared to the sensor signal 124, with the increased number of pixels based on the number of pixels expected by other components of the digital imaging device 100.

At step 212, the image converter 108 may receive the interpolated signal 126 from the interpolator 106 and convert the interpolated signal 126 into a converted signal 128. For example, the image converter 108 may convert an RGB interpolated signal 126 into a YCrCb converted signal 128. At step 214, the image compressor 110 may receive the converted signal 128 from the image converter 108 and compress the converted signal 128 into a compressed signal 130. For example, the image compressor 110 may compress a YCrCb converted signal 128 into a JPEG-format compressed signal 130. At step 216, either or both of the converted signal 128 and the compressed signal 130 may be provided as outputs of the digital imaging device 100, at which point the method comes to an end.

FIG. 3 is a graph illustrating a modulation transfer function (MTF) curve 300 for the high MTF lens 102 of the digital imaging device 100 in accordance with one embodiment of the present invention. For comparison, an MTF curve 302 for a low MTF lens is also illustrated.

The lenses corresponding to these curves 300 and 302 are designed to operate without an optical low pass filter.

According to one embodiment, the curve 300 corresponds to a lens, such at the lens 102, that is designed for a multicolor pixel array sensor, while the curve 302 corresponds to a lens that is designed for a single color VGA pixel array sensor, such as a Bayer pattern imaging array sensor.

The Y-axis is the MTF in percent and the X-axis is the number of line pairs that are cast across the sensor through the lens. For the Bayer array, it is generally accepted that the MTF must fall to nearly 30% at 160 line pairs, which is the Nyquist frequency for a VGA Bayer array. This is done in order to minimize the false colors to an acceptable extent. The Nyquist frequency for a multicolor VGA pixel array sensor is 320 line pairs. At this frequency, moiré patterns will occur if the MTF is high enough at 320 line pairs. It is commonly accepted that an MTF of 30% or less will reduce the moiré pattern to a level where it is not visible, or is so minimal that it will not be very noticeable. As illustrated in FIG. 3, the curve 300 shows the MTF to be around 40%. This is because some level of moiré patterns may be acceptable to the end user. This will depend on the objective of the manufacturer.

This again shows that a multicolor pixel array sensor, such as a three-color Foveon array, is able to resolve a picture element in space that is $\frac{1}{4}^{th}$ the size of that of a Bayer array. The $\frac{1}{4}^{th}$ size is based on the ability to resolve a square in space that is ½ in size on each side less than a VGA Bayer array can resolve. Depending on the level of acceptable moiré patterns, an even higher resolution lens can be used. This is why curve 300 is shown to have an MTF of 40%, which will make the resolution of the lens 102 even sharper.

Therefore, the need either for an optical low pass filter or to blur the light across four pixels is eliminated. The lens 102 may be sharp enough to cast the light on one pixel, which can detect all primary colors, such as RGB. This means a multicolor pixel array sensor 104 with 680×480 pixels can detect four times as many pixels as a single color pixel array sensor. Using the interpolator 106 to interpolate one pixel between any two three-color detectors in the multicolor pixel array sensor 104, RGB data that is 1280×960 may be generated that is equivalent to the output of a 1280×960 single color pixel array sensor. Similarly, RGB data may be generated that is equivalent to the output of any suitable sensor that does not use one Green channel for Red and one Green channel for Blue, e.g., an array that has equal numbers of red, green, and blue sensors that are spaced adjacent to each other. In this case, however, the ratio will be 3:1 instead of 4:1. Thus, using a multicolor pixel array sensor 104, higher resolution may be achieved than that of a single color pixel array sensor with three or four times the number of sensor detectors.

Although the present invention has been described with several embodiments, various changes and modifications may be suggested to one skilled in the art. It is intended that the present invention encompass such changes and modifications as fall within the scope of the appended claims.

What is claimed is:

1. A digital imaging device, comprising:
    a high modulation transfer function lens operable to receive an incoming signal and to provide a focused signal based on the incoming signal; and
    a multicolor pixel array sensor adjacent to the lens, the multicolor pixel array sensor operable to receive the focused signal from the lens and to generate a sensor signal based on the focused signal, the multicolor pixel array sensor comprising multiple pixels, each pixel operable to sample multiple colors;
    wherein the incoming signal comprises light, the focused signal comprises focused light, and the high modulation transfer function lens is operable to focus light rays from a spot of an object onto a single one of the pixels without blurring the light rays.

2. The device of claim 1, the multicolor pixel array sensor comprising a 3-color pixel array sensor operable to sample three colors for each pixel in the multicolor pixel array sensor.

3. The device of claim 1, further comprising an interpolator coupled to the multicolor pixel array sensor.

4. The device of claim 3, the sensor signal comprising data for each of a plurality of pixels in the multicolor pixel array sensor, the interpolator operable to receive the sensor signal from the multicolor pixel array sensor and to interpolate the sensor signal to generate an interpolated signal comprising the data for the plurality of pixels in the multicolor pixel array sensor and estimated data for each of a plurality of estimated pixels.

5. The device of claim 4, the interpolator operable to generate the interpolated signal by estimating data for one estimated pixel for each pixel in the multicolor pixel array sensor.

6. The device of claim 1, further comprising an image converter coupled to the interpolator, the image converter operable to convert the interpolated signal to generate a converted signal.

7. The device of claim 6, the interpolated signal comprising an RGB signal, the image converter operable to convert the interpolated signal into a YCrCb converted signal.

8. The device of claim 6, further comprising an image compressor coupled to the image converter, the image compressor operable to compress the converted signal to generate a compressed signal.

9. The device of claim 8, the image compressor comprising a JPEG image compressor operable to compress the converted signal to generate a JPEG-format compressed signal.

10. A digital imaging device, comprising:
    a high modulation transfer function lens operable to receive an incoming signal and to provide a focused signal based on the incoming signal;
    a multicolor pixel array sensor adjacent to the lens, the multicolor pixel array sensor operable to receive the focused signal from the lens and to generate a sensor signal based on the focused signal, the multicolor pixel array sensor comprising multiple pixels, each pixel operable to sample multiple colors; and
    an interpolator coupled to the multicolor pixel array sensor, the interpolator operable to receive the sensor signal from the multicolor pixel array sensor and to interpolate the sensor signal to generate an interpolated signal;
    wherein the incoming signal comprises light, the focused signal comprises focused light, and the high modulation transfer function lens is operable to focus light rays from a spot of an object onto a single one of the pixels without blurring the light rays.

11. The device of claim 10, the multicolor pixel array sensor comprising a 3-color pixel array sensor operable to sample three colors for each pixel in the multicolor pixel array sensor.

12. The device of claim 11, the sensor signal comprising data for each of a plurality of pixels in the multicolor pixel array sensor, the interpolated signal comprising the data for the plurality of pixels in the multicolor pixel array sensor and estimated data for each of a plurality of estimated pixels.

13. The device of claim 12, the interpolator operable to generate the interpolated signal by estimating data for one estimated pixel between each pair of pixels in the multicolor pixel array sensor and by estimating data for one estimated pixel on a diagonal between pixels in the multicolor pixel array sensor.

14. The device of claim 10, further comprising an image converter coupled to the interpolator, the image converter operable to convert the interpolated signal to generate a converted signal.

15. The device of claim 14, the interpolated signal comprising an RGB signal, the image converter operable to convert the interpolated signal into a YCrCb converted signal.

16. The device of claim 14, further comprising an image compressor coupled to the image converter, the image compressor operable to compress the converted signal to generate a compressed signal.

17. The device of claim 16, the image compressor comprising a JPEG image compressor operable to compress the converted signal to generate a JPEG-format compressed signal.

18. A method for digitally detecting an image, comprising:
receiving an incoming signal;
focusing the incoming signal with a high modulation transfer lens to generate a focused signal; and
sampling from the focused signal at least two colors for each of a plurality of pixels to generate a sensor signal;
wherein the incoming signal comprises light, the focused signal comprises focused light, and the high modulation transfer function lens is operable to focus light rays from a spot of an object onto a single one of the pixels without blurring the light rays.

19. The method of claim 18, further comprising interpolating the sensor signal to generate an interpolated signal.

20. The method of claim 19, further comprising:
converting the interpolated signal to generate a converted signal; and
compressing the converted signal to generate a compressed signal.

* * * * *